United States Patent [19]

Siiberg

[11] 4,327,401
[45] Apr. 27, 1982

[54] RECHARGEABLE FLASHLIGHT WITH INTEGRAL VARIABLE RATE BATTERY CHARGER FOR AUTOMOTIVE USE

[75] Inventor: Hemming G. Siiberg, New Providence, N.J.

[73] Assignee: McGraw-Edison Company, Rolling Meadows, Ill.

[21] Appl. No.: 128,808

[22] Filed: Mar. 10, 1980

Related U.S. Application Data

[62] Division of Ser. No. 932,644, Aug. 10, 1978, Pat. No. 4,224,658.

[51] Int. Cl.³ .............................................. F21L 7/00
[52] U.S. Cl. .................................... 362/183; 362/191; 362/205; 320/4; 320/36
[58] Field of Search ....................... 362/183, 191, 205; 320/4, 36

[56] References Cited

U.S. PATENT DOCUMENTS 4,224,658  9/1980  Silberg ................................. 362/183

Primary Examiner—Stephen J. Lechert, Jr.
Attorney, Agent, or Firm—Ronald J. LaPorte; Jon Carl Gealow; Charles W. MacKinnon

[57] ABSTRACT

A rechargeable flashlight fits into and draws recharging power from an automotive type cigar lighter socket. A thermally controlled charging circuit within the flashlight adjusts the charging rate according to the ambient temperature. When the flashlight is withdrawn from the cigar lighter socket, it is illuminated; when it is replaced it is extinguished. Alternatively, the flashlight may be manually illuminated or extinguished outside the charging socket.

6 Claims, 11 Drawing Figures

RECHARGEABLE FLASHLIGHT WITH INTEGRAL VARIABLE RATE BATTERY CHARGER FOR AUTOMOTIVE USE

This is a division of application Ser. No. 932,644, filed Aug. 10, 1978 U.S. Pat. No. 4,224,658.

BACKGROUND OF THE INVENTION

Battery operated rechargeable appliances usually employ nickel cadmium rechargeable batteries as a power source. Nickel cadmium batteries can be recharged many times between use and are not damaged by high-rate deep discharge. In addition, these batteries are small and can be used to power relatively large loads.

The permissible charging rate in nickel cadmium batteries varies widely with temperature. In the vicinity of normal room temperature (20°–35° C.) a typical ⅜AA nickel cadmium battery can be charged at a continuous overcharge rate of about 30 milliamperes. At low temperature the allowable charge rate drops to 2 milliamperes and at high temperatures of around 65° C., the charging rate drops to about 10 milliamperes. Normal household appliances encounter temperatures in the 20–35° C. rage and the higher charging rate of 30 milliamperes is appropriate.

The automotive temperature environment has prevented the use of rechargeable nickel cadmium batteries due to the wide variation in permissible charging rates required by the great temperature ranges normally encountered in vehicles, even though an appropriate source of power is readily available in the automotive storage battery and its generator or alternator supply.

SUMMARY OF THE INVENTION

The present invention solves the problem of variable permissible charging rate of nickel cadmium batteries over the entire range of temperatures encountered in the outdoor environment. In addition, a useful and convenient rechargeable flashlight is disclosed which is always kept fully charged and available in the automotive cigar lighter. The rechargeable flashlight is automativally illuminated by the act of removing it from the cigar lighter and is extinguished by the act of replacing it in the cigar lighter.

The present invention employs a temperature controlled charging network which maintains the charging current to a nickel cadmium battery within the permissible range. A matched pair of thermistors comprising a negative temperature coefficient (NTC) and a positive temperature coefficient (PTC) thermistor are placed in series between the automotive battery and the nickel cadmium battery during charging. The sum of resistances placed in series with the nickel cadmium battery varies with temperature such that the minimum resistance occurs in the room temperature region of between 20° and 35° C. and the resitance increases on each side of the minimum. The current passing through the thermistor network consequently reaches a peak within the maximum permissible charging current at the temperature of minimum resistance in the thermistor network and falls off on either side thereof at values which control the charging rate within the acceptable region throughout the entire range of possible temperatures.

The thermistor network, battery and lamp are contained in a case which forms a plug suitable for fitting into and drawing power from a conventional cigar lighter in an automotive vehicle. A switch within the flashlight is actuated into the charging position by the pressure employed to force the flashlight into the cigar lighter socket. In the charging position, the thermistor network is placed in series between the power source on the vehicle and the nickel cadmium battery. When the flashlight is removed from the cigar lighter socket, the force necessary to remove it operates the switch into the on position removing the thermistor network from connection with the battery and, instead, connecting the lamp and battery in series. Consequently, when the flashlight is removed from the cigar lighter socket, the lamp is illuminated. When the flashlight is pressed into the cigar lighter socket, the lamp is extinguished and the charging circuit is established. The lamp can also be manually illuminated or extinguished external to the cigar lighter socket by manipulating the plug rather than by removing or inserting the flashlight in the cigar lighter socket.

DETAILED DESCRIPTION OF THE PREFERRED EMBODIMENT

Figure 1:
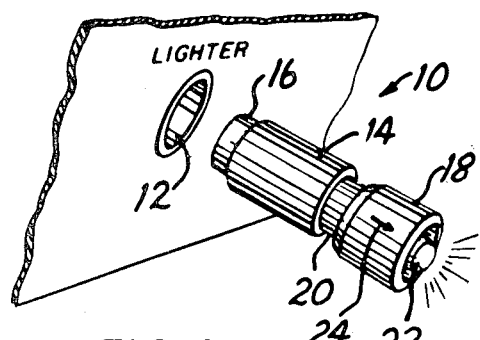
FIG. 1 shows a rechargeable flashlight according to the present invention withdrawn from its socket and illuminated.

Referring now to FIG. 1 there is shown generally at 10 a rechargeable flashlight according to the present invention. The rechargeable flashlight 10 enclosed within a case is shown withdrawn from a cigar lighter socket 12 of a type well known in the art.

A shell 14 on the rechargeable flashlight 10 is adapted to slide into the cigar lighter socket 12 with considerable friction as is conventional in cigar lighter applications. An end cap 16 is located at the inner extremity of the rechargeable flashlight 10 and makes electrical contact with one terminal within the cigar lighter socket 12. The contact of the shell 14 with the inside of the cigar lighter socket provides a second electrical contact.

A ring 18 at the outer end of the rechargeable flashlight 10 is connected thereto by a slide tube 20. A lamp 22 which is appropriate to the voltage and power capability of a nickel cadmium battery is located in the forward end of the ring 18.

When the rechargeable flashlight 10 is withdrawn from the cigar lighter socket 12 by grasping the ring 18 and applying force in the direction shown by the arrow 24, the slide tube 20 attached to the ring 18 is pulled partway out from the shell 14 due to the frictional fit between the shell 14 and the cigar lighter socket 12. This causes the lamp 22 to become illustrated and causes the charging circuit to be disconnected as will be explained.

Figure 2:
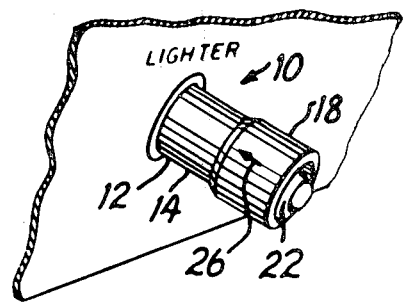
FIG. 2 shows a rechargeable flashlight according to the present invention inserted into its socket and extinguished.

Referring now to FIG. 2, the rechargeable flashlight 10 is shown inserted into the cigar lighter socket 12. When force is applied to the ring 18 to insert the rechargeable flashlight 10 into the cigar ligher socket 12 against the frictional resistance between the shell 14 and the cigar lighter socket 12 in the direction shown by the arrow 26, the slide tube 20 is moved inward into the shell 14 and the ring 18 is moved closer to the shell 14. This causes the lamp 22 to become extinguished and the charging circuit, described later, to become engaged.

Figure 3:
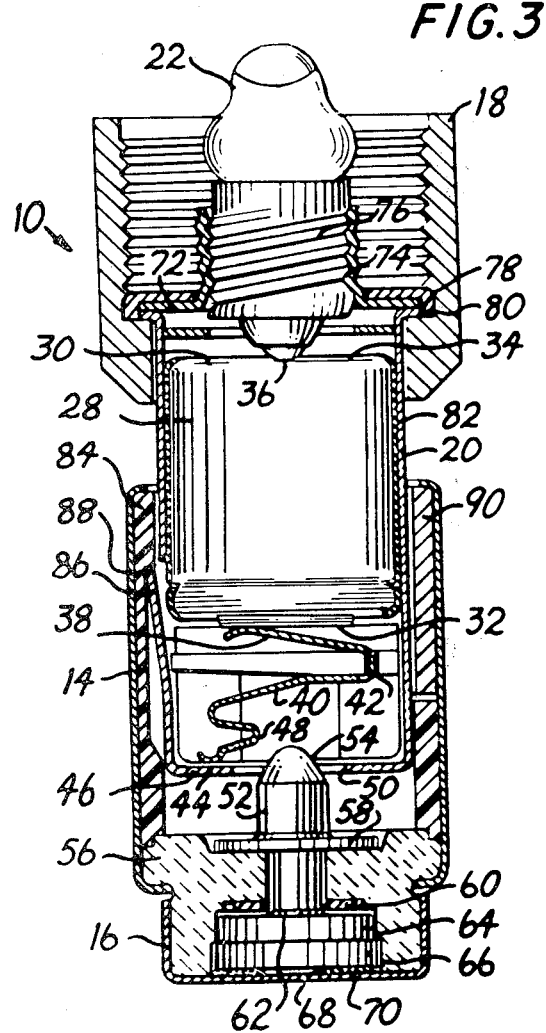
FIG. 3 shows a cross section of a rechargeable flashlight according to the present invention in the condition for illumination of the lamp.

Referring now to FIG. 3, there is shown the rechargeable flashlight 10 arranged for illumination of the lamp 22. A battery 28 preferably a rechargeable nickel cadmium battery of the type having a metallic shell 30 covering the perimeter and one end and a metallic contact 32 at the other end is disposed in the interior of the slide tube 20. The metallic shell 30 at the end 34 of the battery 28 is pressed upward against terminal 36 of the lamp 22. A spring 38 presses upward on metallic contact 32 to maintain the battery in position and to provide electrical contact thereto. An insulating tube 82 covering the perimeter of the battery 28 prevents contact between the metallic shell 30 and the inside of the slide tube 20.

A serpentine lower spring 40 is connected to the spring 38 by an intermediate metallic portion 42. The serpentine lower spring 40 has a lamp contact 44 which, in the position shown, is pressed against the bottom 46 of the slide tube 20. The serpentine lower spring 40 also has a charging contact 48.

An opening 50 is axially located in the bottom 46 of slide tube 20. An actuator 52 aligned with the opening 50 has a generally cone-shaped head 54. The actuator 52 is retained in an insulating body 56 by a collar 58 and a washer 60.

The lower end 62 of the actuator 52 is in electrical contact with one terminal of a negative temperature coefficient thermistor 64. The second terminal of the NTC thermistor 64 is in contact with one terminal of a positive temperature coefficient thermistor 66. The second terminal of the PTC thermistor 66 is in contact with one side of a resilient conductive spacer 68. The second side of the conductive spacer 68 is in contact with the bottom 70 of end cap 16. The conductive spacer 68 takes up any manufacturing tolerances in the thermistors and the actuator to ensure a good electrical conducting path between the cap 16 and the actuator 52. The conductive spacer 68 may be a resilient mass such as conductive rubber or plastic or it may be a metallic spring to provide an upward resilient bias urging the thermistors 64, 66 against the washer 60. As shown, the PTC and NTC thermistors 66, 64 are electrically in series between the end cap 16 and the actuator 52.

At its upper end, the slide tube 20 is electrically connected to a lamp carrier 72 having a threaded socket 74 centrally located therein. The lamp 22 has a threaded barrel 76 about its circumference which is shown in threaded mesh with the threaded socket 74.

A flange 78 on the slide tube 20 makes electrical contact with lamp carrier 72. A clamp ring 80 holds the lamp carrier 72 and flange 78 in the ring 18. Therefore, when the ring 18 is pulled or pushed in the axial direction, a corresponding axial force is applied to the slide tube 20 to force it into or pull it out of the shell 14.

The slide tube 20 fits into a plastic tubular housing 84. A tang 86 on the slide tube 20 angles outward and engages an abutment 88 in the plastic tubular housing 84 to positively limit the outward motion of the slide tube 20 from the plastic tubular housing 84.

A spring member 90 of a type well known in the art provides a resilient conductive biasing force between the inside of the shell 14 and the outside of the slide tube 20. The spring member 90 provides electrical continuity between the shell 14 and the slide tube 20 at all times. In addition, the frictional resistance provided by spring member 90 tends to maintain the slide tube 20 in whichever position it is placed.

In the condition shown, a continuous electrical circuit is formed from metallic contact 32 on battery 28 through spring 38, serpentine lower spring 40, lamp contact 44 between serpentine lower spring 40 and the bottom 46 of slide tube 20, lamp carrier 72, threaded barrel 76, filament in the lamp 22 (not shown), and through terminal 36 of the lamp 22 to the end 34 of the battery 28. This continuous circuit causes the lamp 22 to be illuminated.

Figure 4:
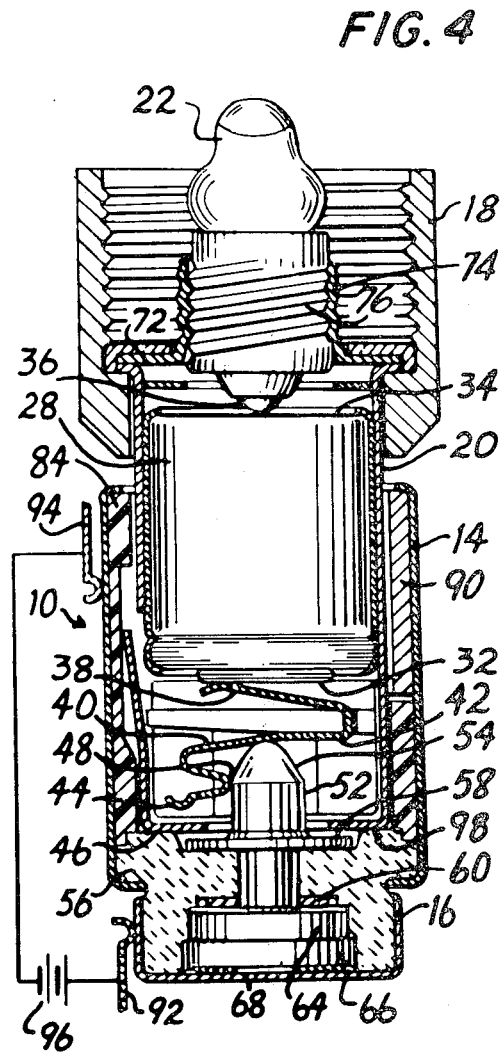
FIG. 4 shows a cross section of a rechargeable flashlight according to the present invention arranged for charging of the rechargeable battery.

Referring now to FIG. 4, there is shown the rechargeable flashlight 10 of the present invention arranged for charging of the battery 28. The rechargeable flashlight 10 is arranged for charging by being inserted into a standard cigar lighter socket partially represented in FIG. 4 by the positive contact 92 contacting the end cap 16 and the negative contact 94 contacting the shell 14. The positive contact 92 is connected to the positive terminal of the schematically shown automotive battery 96, and the negative contact 94 is connected to the negative terminal of the automotive battery 96.

The act of insertion of the rechargeable flashlight 10 into the cigar lighter socket 12 involves pressing inward on ring 18. This results in slide tube 20 sliding inward into the plastic tubular housing 84 until the bottom 46 of the slide tube 20 is stopped by abutment surface 98 on insulating mass 56. As the tube 20 is slid into the plastic tubular housing 84, the actuator 52 engages charging contacts 48 of the serpentine spring 40 and thus lifts lamp contact 44 out of conductive engagement with the bottom 46 of slide tube 20. This breaks the lamp illumination circuit and thus extinguishes the lamp. A charging circuit is formed from the automotive battery 96 to the battery 28 by way of positive contact 92, end cap 16, conductive spacer 68, positive temperature coefficient thermistor 66, negative temperature coefficient thermistor 64, actuator 52, charging contact 48, serpentine spring 40, spring 38, metallic contact 32 of battery 28, end 34 of battery 28, contact 36 of lamp 22, the lamp filament (not shown), threaded socket 74, lamp carrier 72, slide tube 20, metallic spring member 90, shell 14, and negative contact 94 back to the negative terminal of the automotive battery. The rechargeable battery 28 is thereby connected for recharge through the two thermistors 66 and 64 and the lamp filament. The charging current in the circuit is insufficient to illuminate the lamp filament during charging. The lamp filament therefore merely acts as a substantially constant series resistance in the charging circuit.

Figure 5:
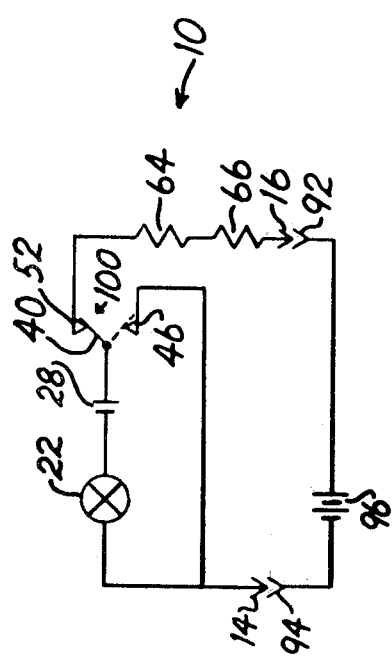
FIG. 5 shows a schematic diagram of the rechargeable flashlight according to the present invention as well as an automotive battery to which it may be connected.

Referring now to FIG. 5, there is shown a schematic diagram of the rechargeable flashlight 10 showing the switching method for illumination and charging wherein the reference numerals are the same for similar parts as described in connection with previous figures. The single-pole double-throw switch 100 is formed by actuator 52, bottom 46 of slide tube 20 and serpentine spring 40. When in the charging position shown in full line, SPDT switch 100 connects the two thermistors 64, 66 in series with the automotive battery 96, the rechargeable battery 28 and the lamp 22. When in the lamp on condition shown in dashed line, switch 100 disconnects the thermistor network 64, 66 and connects the positive terminal of the rechargeable battery 28 directly to the lamp 22 to become illuminated.

Figure 6:
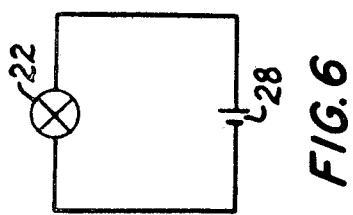
FIG. 6 shows a simplified diagram of the rechargeable flashlight connected for illumination of the lamp.

The simplified schematic diagram in FIG. 6 shows the illumination circuit, established as in FIGS. 1 and 3. The battery 28 and lamp are connected in parallel.

Figure 7:
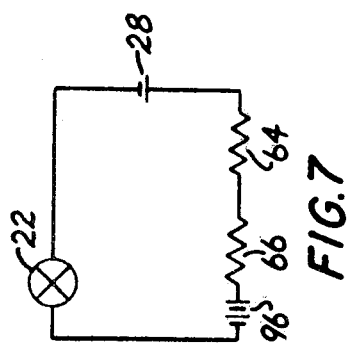
FIG. 7 shows a simplified schematic diagram of the rechargeable flashlight according to the present invention connected for recharging from an automotive battery.

The simplified schematic diagram in FIG. 7 shows the charging circuit established as in FIGS. 2 and 4. The positive terminal of automotive battery 96 is connected through thermistors 66 and 64 to one terminal of rechargeable battery 28. The negative terminal of automotive battery 96 is connected through lamp 22 to the other terminal of rechargeable battery 28.

It would be clear to one skilled in the art that the sequence of components in the charging circuit of FIG. 7 is immaterial. The two thermistors 64, 66 and the lamp can be permuted and transposed without any effect on circuit function.

The arrangement of FIGS. 3 and 4 in which the two thermistors 64, 66 be in close proximity has the disadvantage that heat generated by one of the thermistors can influence the other thermistor. It may be preferable to thermally separate the two thermistors 64, 66 from each other to reduce this effect and, in fact, this is the preferred embodiment. Furthermore, it is desirable that the thermistors 64, 66 follow the temperature of the battery 28. The invention also contemplates placing the thermistors 64, 66 into close thermal contact with the rechargeabe battery 28 to accomplish this. Thermal isolation between the two thermistors can be improved by placing the two thermistors at opposite ends of the rechargeable battery 28.

Figure 8:
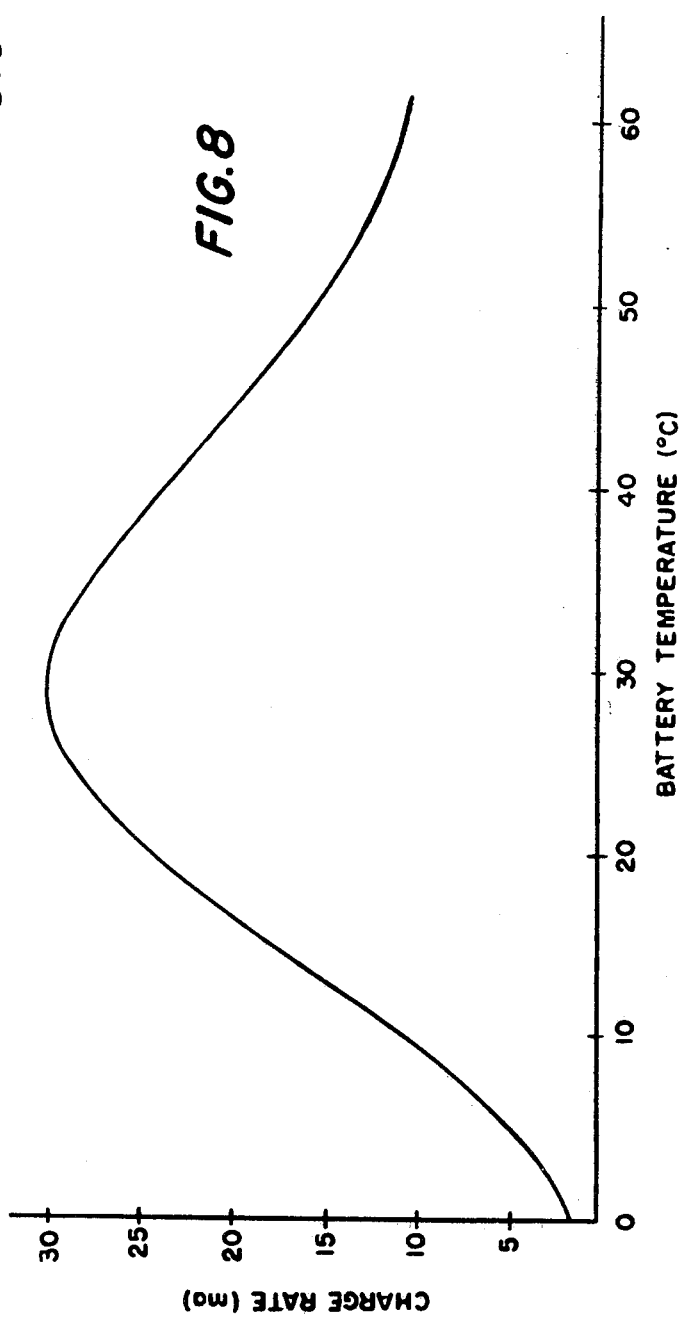
FIG. 8 shows a curve of maximum allowable charging rate versus battery temperature.

FIG. 8 shows the permissible charge rate for a particular nickel cadmium battery of the type manufactured by General Electric Corporation under the identification XKCF 100 ST for varying battery temperature. It is noted that the maximum permissible charging rate of 30 milliamperes occurs in the vicinity of 28° C. and decreases on either side of 28° C.

Figure 9:
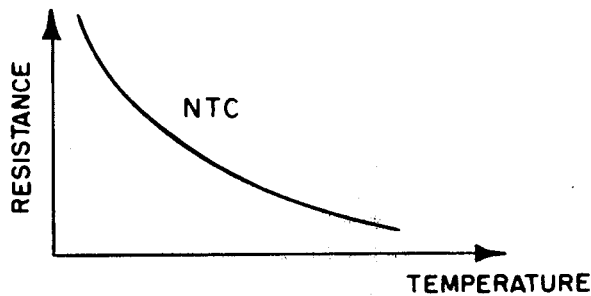
FIG. 9 shows a curve of resistance versus temperature for an NTC thermistor.
Figure 10:
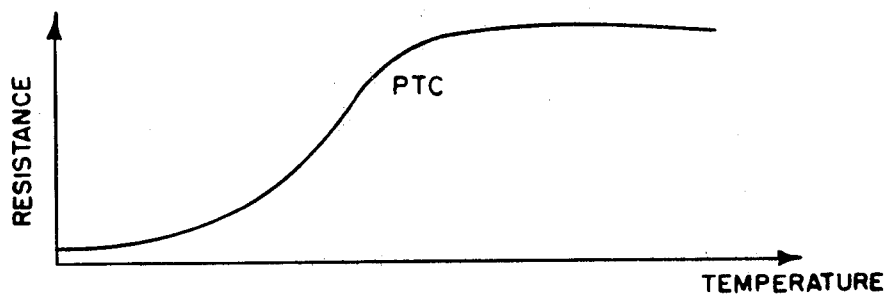
FIG. 10 shows a curve of resistance versus temperature for a PTC thermistor.
Figure 11:
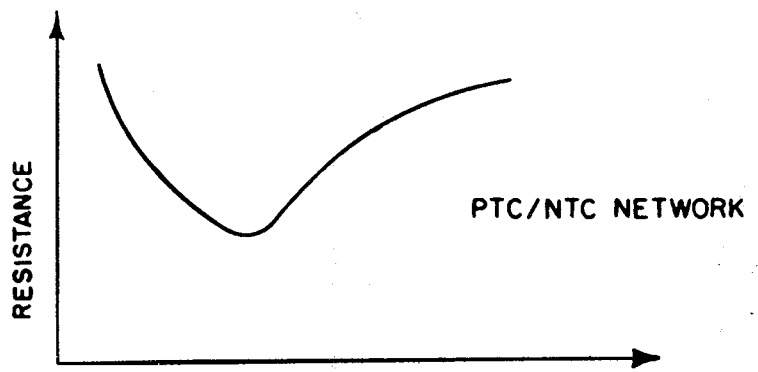
FIG. 11 shows a curve for resistance versus temperature for a series combination of PTC and NTC thermistors.

The resistance of an NTC thermistor versus temperature is shown in FIG. 9. The resistance of a PTC thermistor versus temperature is shown in FIG. 10. The sum of the resistances of the PTC and NTC series network is shown in FIG. 11.

Although other battery and lamp arrangements may require other thermistor characteristics, the following specific thermistors were used in one embodiment reduced to practice:

NTC thermistor—MCI Part No. T1084
PTC thermistor—MCI Part No. P57171

With the combination previously described, a rechargeable flashlight 10 according to the present invention can be charged from a 12 volt automotive battery source over the range of ambient temperatures normally encountered in automotive applications without danger of battery damage due to excessive charge rate at any temperature. The combined network resistance shown in FIG. 11 when placed in series with the fixed resistance of the lamp 22 provides a limit to the maximum charging rate within the limits shown in FIG. 8 for all battery temperatures.

It would be clear to one skilled in the art that various changes could be made in the present invention without departing from the spirit and scope of the invention. For example, two or more rechargeable batteries 28 could be connected in the series in the flashlight to permit longer discharge time or brighter lamp. This would require a change in the values of the NTC and PTC thermistors to control the charging rate. One skilled in the art would be capable of selecting appropriate thermistors and other components from those readily available on the commercial market without any experimentation whatsoever in the light of the present specification. Similarly, a charging path to the battery 28 could be established which eliminates the lamp filament in series with the charging path. This would again require an adjustment in the specifications of the two thermistors according to principles well known by those skilled in the art. Other types of batteries, including Nickel Cadmium and others, may require a different relationship between changing rate and environmental variables.

It will be understood that the claims are intended to cover all changes and modifications of the preferred embodiments of the invention, herein chosen for the purpose of illustration which do not constitute departures from the spirit and scope of the invention.

I claim:

1. In a rechargeable flashlight, a switching device comprising:
   (a) a housing;
   (b) a sliding member in said housing, said sliding member being electrically conducting;
   (c) said sliding member being movable between a first and second position;
   (d) means for electrically connecting said sliding member into an electrical lamp circuit;
   (e) a rechargeable battery in said housing, said rechargeable battery having two terminals, one of said terminals being electrically connected into said electrical lamp circuit;
   (f) an electrically-conducting actuating member fixed in said housing;
   (g) said actuation member being electrically insulated from said sliding member;
   (h) means for electrically connecting said actuating member to a battery-charging means;
   (i) a spring having two ends, said spring positioned between said actuation member and said rechargeable battery so as to be moved from a first position to a second position by said electrically conducting actuating member when said sliding member is moved from said first position to said second position;
   (j) one end of said spring is electrically connected to the other terminal of said rechargeable battery;

(k) the other end of said spring is biased into electrical contact with said sliding member when said sliding member is in said first position; and (l) said spring being lifted from electrical contact with said sliding member by mechanical and electrical contact with said actuating member when said sliding member is in said second position.

2. The switching device of claim 1 wherein said sliding member is a sliding tube holding said rechargeable battery, said rechargeable battery being electrically insulated from said sliding tube.

3. The switching device of claim 1 wherein said battery-charging means comprises a charging network including a negative-temperature-coefficient and thermistor and a positive-temperature-coefficient thermistor in series, said thermistors contributing sufficient resistance to limit charging current to predetermined values at all temperatures.

4. The switching device of claim 1 wherein said housing forms a plug suitable for fitting into and making electrical connection with an automotive cigar lighter socket.

5. In a rechargeable flashlight, a switching device operative to change said rechargeable flashlight between an illuminating mode and a charging mode in a charging network therein comprising:

(a) a housing;

(b) an electrically conductive slide tube in said housing, said slide tube holding said rechargeable battery and said lamp, said rechargeable battery being electrically insulated from said slide tube;

(c) said slide tube having first and second positions in said case;

(d) said lamp having two terminals;

(e) said rechargeable battery having two terminals, one of said terminals of said rechargeable battery being in electrical contact with one terminal of said lamp;

(f) the remaining terminal of said lamp being in electrical contact with said slide tube;

(g) a spring in contact with said second terminal of said battery;

(h) said spring having a lamp contact;

(i) said spring having a charging contact;

(j) an actuator positioned in said case to move said spring from a first position to a second position when said slide tube is moved from said first position to said second position;

(k) said actuating member being electrically conducting;

(l) means for connecting said actuating member into said charging network;

(m) said spring in said first position of said slide tube being biased to contact said slide tube at said lamp contact; and (n) said actuator in a second position of said slide tube lifting said spring from contact with said slide tube and contacting said spring at said charging contact.

6. In a rechargeable flashlight of the type for insertion into an automotive cigar lighter socket for charging of said rechargeable flashlight therein, a switching device operative to place said flashlight in the charging mode upon insertion into said automotive cigar lighter socket comprising:

(a) a housing, said housing forming a plug suitable for fitting into and making electrical connection with an automotive cigar ligher socket;

(b) a sliding tube in said housing, said sliding tube being electrically conducting;

(c) said sliding tube being movable between a first and second position, said sliding tube being in said second position when said housing is fitted into said automotive cigar lighter socket;

(d) means for electrically connecting said sliding member into an electrical lamp circuit;

(e) a rechargeable battery in said housing, said rechargeable battery having two terminals, one of said terminals being electrically connected into said electrical lamp circuit;

(f) an electrically-conducting actuating member fixed in said housing;

(g) said actuation member being electrically insulated from said sliding member;

(h) means for electrically connecting said actuating member to a battery-charging means;

(i) a spring having two ends, said spring positioned between said actuation member and said rechargeable battery so as to be moved from a first position to a second position by said electrically conducting actuating member when said sliding member is moved from said first position to said second position;

(j) one end of said spring is electrically connected to the other terminal of said rechargeable battery;

(k) the other end of said spring is biased into electrical contact with said sliding member when said sliding member is in said first position; and (l) said spring being lifted from electrical contact with said sliding member by mechanical and electrical contact with said actuating member when said sliding member is in said second position.

* * * * *